Sept. 23, 1924.

H. CLAY 1,509,284

CONSTRUCTION OF SHIPS, BOATS, AND OTHER VESSELS

Filed April 12, 1921

INVENTOR
Henry Clay
By Wm Wallace White
ATTY.

Sept. 23, 1924.

H. CLAY

1,509,284

CONSTRUCTION OF SHIPS, BOATS, AND OTHER VESSELS

Filed April 12, 1921    9 Sheets-Sheet 2

INVENTOR:
Henry Clay
BY Wm Wallace White
ATTY.

Sept. 23, 1924.

H. CLAY

1,509,284

CONSTRUCTION OF SHIPS, BOATS, AND OTHER VESSELS

Filed April 12, 1921      9 Sheets-Sheet 3

INVENTOR:
Henry Clay
BY Wm Wallace White
ATTY.

Sept. 23, 1924.

H. CLAY

1,509,284

CONSTRUCTION OF SHIPS, BOATS, AND OTHER VESSELS

Filed April 12, 1921    9 Sheets-Sheet 5

Sept. 23, 1924. 1,509,284
H. CLAY
CONSTRUCTION OF SHIPS, BOATS, AND OTHER VESSELS
Filed April 12, 1921 9 Sheets-Sheet 6

INVENTOR:
Henry Clay
By Wm Wallace White
ATTY.

Sept. 23, 1924.　　　　　　　　　　　　　　　1,509,284
H. CLAY
CONSTRUCTION OF SHIPS, BOATS, AND OTHER VESSELS
Filed April 12, 1921　　　9 Sheets-Sheet 7

INVENTOR:
Henry Clay
By Wm Wallace White
ATTY.

Sept. 23, 1924.

H. CLAY

1,509,284

CONSTRUCTION OF SHIPS, BOATS, AND OTHER VESSELS

Filed April 12, 1921   9 Sheets-Sheet 8

Sept. 23, 1924.

H. CLAY 1,509,284

CONSTRUCTION OF SHIPS, BOATS, AND OTHER VESSELS

Filed April 12, 1921 9 Sheets-Sheet 9

INVENTOR:
Henry Clay
By Wm Wallace White
ATTY.

Patented Sept. 23, 1924.

1,509,284

UNITED STATES PATENT OFFICE.

HENRY CLAY, OF CAMDEN TOWN, LONDON, ENGLAND.

CONSTRUCTION OF SHIPS, BOATS, AND OTHER VESSELS.

Application filed April 12, 1921. Serial No. 460,616.

*To all whom it may concern:*

Be it known that I, HENRY CLAY, of Camden Town, London, England, a subject of the King of Great Britain and Ireland, have invented certain new and useful Improvements in the Construction of Ships, Boats, and Other Vessels, of which the following is a specification.

This invention relates to ships and to all kinds of vessels adapted to travel upon water, as distinguished from vessels which are adapted to float but are not required to travel from place to place upon water.

The object of this invention is to provide an improved construction of ship adapted for and equipped with improved means for propulsion, calculated to enable the ship to be propelled at high speeds which for the same expenditure of power have been unattainable with ships as constructed and equipped up to the present time.

The invention consists in the improved construction of ships and vessels of all kinds which are required to travel upon water in which the bow or forward portion is of shallow draught and the stern or after portion of considerably greater draught relatively to the bow portion, the bottom of the ship being flat and provided with a plurality of plates arranged edge on towards the ship's bottom to form "air chutes" or chambers designed to entrap and accumulate therein compressed air forced thereinto by means of the propelling or other apparatus carried by the vessel, or by the motion of the vessel when propelled or by the wind, whereby the vessel while in motion is supported upon entrapped compressed air.

The invention also comprises the combined use with this improved construction of various apparatus and mechanism specially designed to provide a supply of air under pressure and to control the inlet and accumulation of air into and within the air chutes beneath the bottom of the ship, and also the escape of air therefrom.

The invention further comprises the special construction of the bow portion adapted to prevent the bow from dipping, to reduce the resistance of the air to the movement of the ship, and to act as an air inlet channel to the propelling and air-forcing apparatus.

In order that the nature of the invention may be clearly understood various examples of the improved construction in accordance therewith will now be described with the aid of the accompanying diagrammatic drawings, in which—

Fig. 17 is a plan view, and

Fig. 19 is a side view and

Referring to Figs. 1 to 7 of the drawings, a small type of vessel is shown herein in order to illustrate the main principles of my improved construction. In the forward part of the vessel is shown the aero-hydro screw propeller 1 mounted upon a shaft 2 which may be driven by any suitable kind of engine or motor arranged, in the example shown, in the central part of the vessel.

Figure 1:
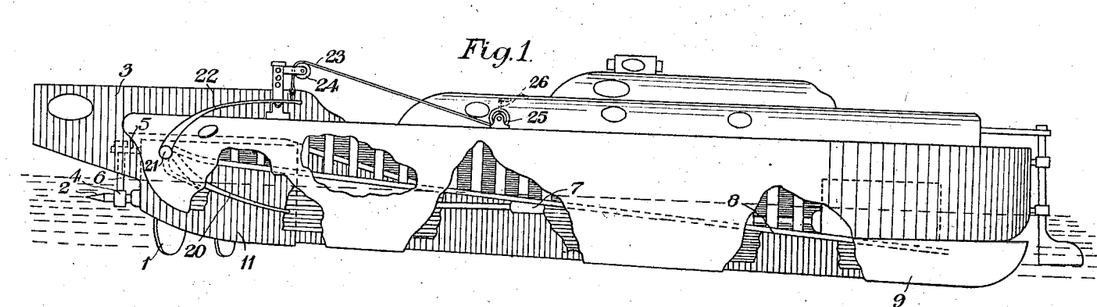
Fig. 1 is a side view partly broken away of a small type of vessel constructed in accordance with my invention, the vessel being supposed to be under propulsion and therefore bodily lifted by compressed air above the water.
Figure 2:
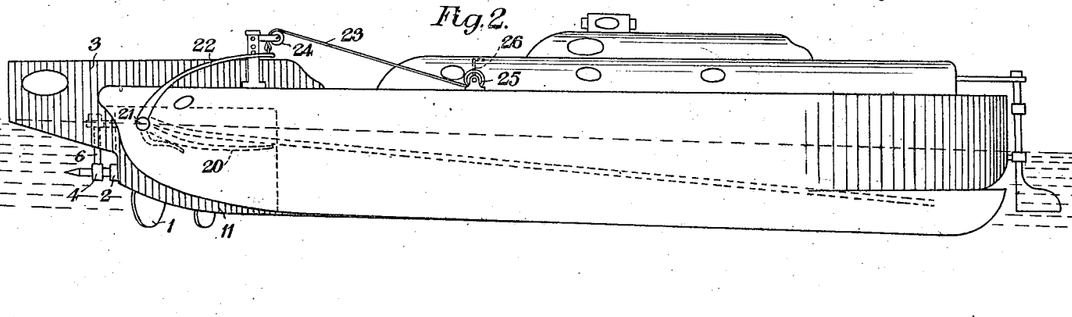
Fig. 2 is a similar view to Fig. 1 showing the vessel in a state of repose and therefore deeper in the water.
Figure 3:
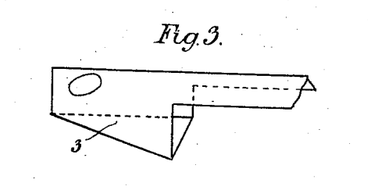
Fig. 3 is a detail perspective view illustrating a special construction of the bow portion which I have designed for the purpose of preventing the dipping of the bow and of enabling the same to cut through the waves.

The forward end of the vessel terminates in the projecting bow portion 3 which is arranged over and projects beyond the aero-hydro screw propeller 1 (Figs. 1, 2, 3 and 11). The front bearing 4 for the driving shaft 2 is conveninetly supported from the bow of the vessel by means of the bracket 5 and hanger 6 while the after bearing 7 is secured to the bottom 8 of the vessel (Fig. 1).

Figure 23:
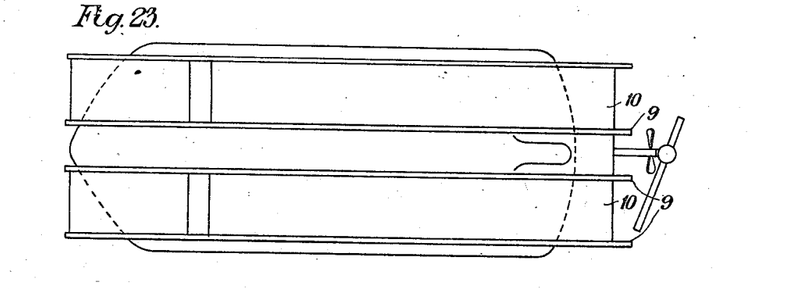
Fig. 23 is a bottom plan view of the vessel shown in Figs. 21 and 22.
Figure 24:
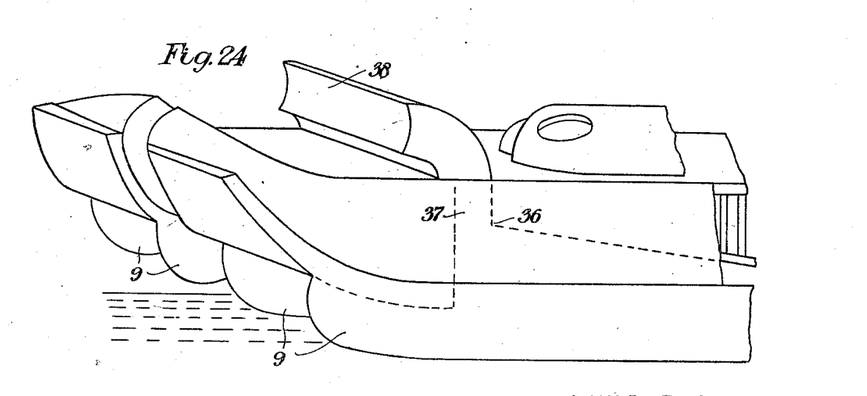
Fig. 24 is a perspective view of the vessel shown in Figs. 21 to 23 equipped with an air inlet opening mounted on the deck.

To the bottom 8 of the vessel and edge on thereto a number of longitudinally arranged plates 9 are secured forming between them air chutes or chambers 10 in which the air forced and compressed by the aero-hydro screw propeller is accumulated. The after ends of the plates 9 are clearly seen in Figs. 11 and 20 projecting somewhat beyond the stern of the vessel. Fig. 23 shows the bottom of the vessel equipped with four longitudinal plates 9 providing three air chutes 10 while Fig. 24 shows the said plates 9 in elevation projecting forward at the bow end.

Figure 8:
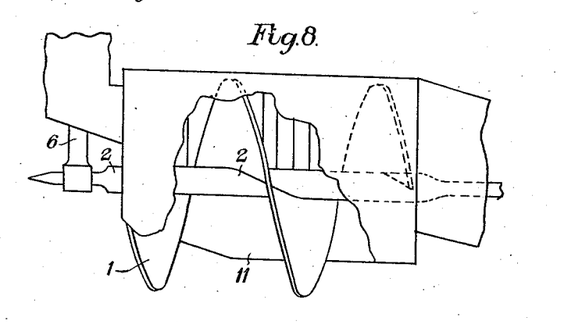
Fig. 8 illustrates an aero-hydro screw propeller arranged in a semi-cylindrical casing adapted for use with my improved construction of ships and similar vessels.

The aero-hydro screw propeller 1 is arranged within a semi-cylindrical casing 11 (Figs. 1 and 8) enclosing the upper part of the screw which projects upwardly out of the water and rotates in air only. The interior of the semi-cylindrical casing 11 communicates with the atmosphere through the open inner end of the projecting bow portion 3 and by suitable passages with the air chutes 10 so that the rotation of the screw in the proper direction for propelling the vessel forward forces air down from the semi-cylindrical casing 11 into the air chutes 10 where the air is accumulated under pressure until it bodily raises the vessel above the surrounding water thus reducing the frictional water resistance to the progress of the vessel and greatly increasing the speed which can be imparted to the vessel.

Figures 4, 5:
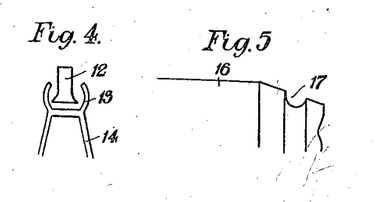
Fig. 4 shows in cross section a rubber tire for insertion in the edge of the aero-hydro screw propeller hereinafter described.
Fig. 5 shows a portion of the cylindrical aero-hydro screw propeller shown in Fig. 10, the tapered inner end of the same, and a groove therein adapted to receive a rubber tire.
Figure 6:
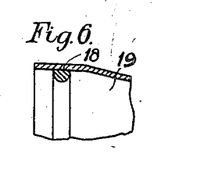
Fig. 6 illustrates the said rubber tire let into the groove in the tapered end of the cylinder shown in Fig. 5.

In order to more effectually prevent the escape of air round the screw, the edge of the latter may be proveded with a rubber tire 12 let into a recess 13 formed upon the edge of the hollow worm 14 as shown in Fig. 4.

Figure 9:
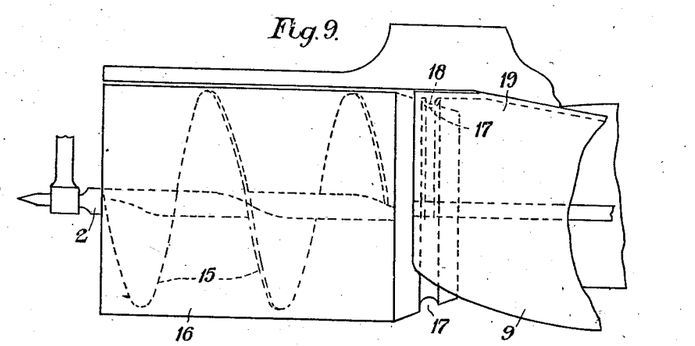
Fig. 9 is a side view of another form of the said aero-hydro screw propeller in position adjacent to the open end of one of the air storage chambers beneath the bottom of the vessel.
Figure 10:
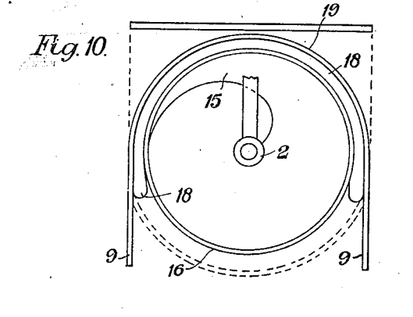
Fig. 10 is an end view of the apparatus shown in Fig. 9.
Figure 11:
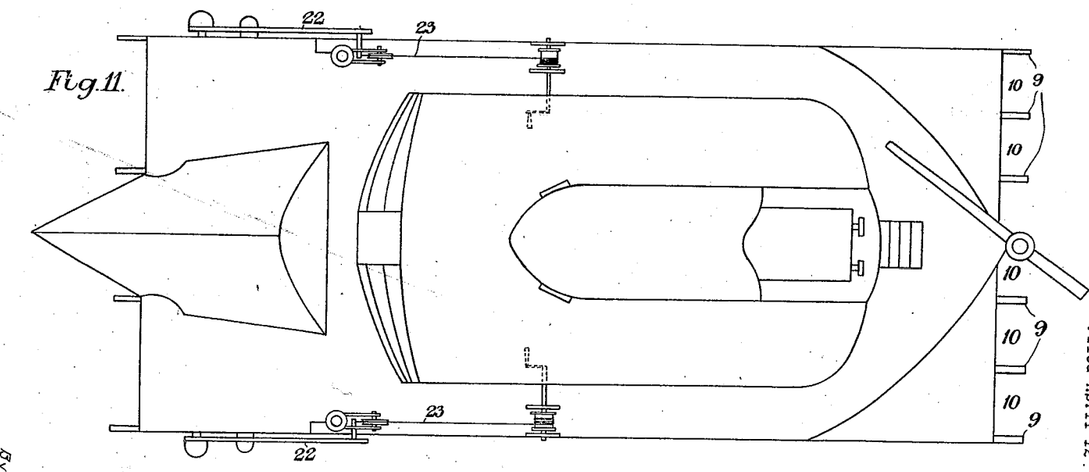
Fig. 11 is a plan view of the vessel shown in Figs. 1 and 2, illustrating suitable mechanism for raising the bow plates preparatory to reversing.

Figs. 5, 6, 9 and 10 show a form of the aero-hydro screw propeller in which the worm plate 15 is enclosed within a complete cylinder 16 to the interior of which the outer edges of the worm 15 are firmly secured while the inner edges of the worm are secured, as before, to the periphery of the hollow driving shaft 2. For preventing the escape of air with this arrangement, a groove 17 (Fig. 5) is provided round the after end of the cylinder 16 adapted to receive the rubber tyre 18 which is fixed round the interior of the arched air chute 19 and extends below the water line to the lower straight parts of the plates 9 as clearly shown in Figs. 6 and 10. The combined assemblage of these parts is shown in Fig. 9 in which it will be seen that the upper half of the cylinder 16 containing the screw and worm plate 15 rotates above the water line in airtight contact with the interior of the arched air chute 19 by means of the groove 17 and rubber tire 18. In this arrangement the after end of the cylinder 16 is preferably tapered slightly as shown so as to fit within the forward end of the arched air chute 19.

Figs. 1, 2, 7, 11 and 12, show arrangements of the "pneumatic bow plates" referred to above, together with means for operating the same. These plates 20 (Figs. 1 and 2) are placed within the forward ends of the air chutes 10 and are pivotally suspended from the bottom 8 of the vessel at the forward end on pivots 21. The action of these bow plates is automatic during the forward travel of the vessel at which time the said plates are allowed to work up and down within the air chutes 10. In certain circumstances, for instance when it is desired to reverse the direction of travel of the vessel, the bow plates can be raised close to, or flush with, the bottom 8 of the vessel, for which purpose any suitable means may be provided. In the arrangements illustrated the bow plates are raised when desired by means of levers 22 operated by chains 23 passing over guide rollers 24 and thence to winches 25 operated by means of manually actuated crank handles 26.

Figure 7:
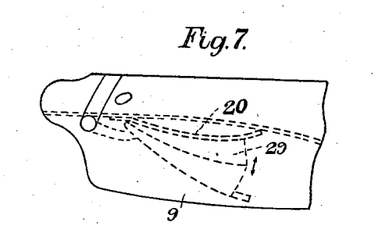
Fig. 7 illustrates one way of controlling the inlet of air into, and the accumulation of the same in the air storage chambers beneath the bottom of the vessel.
Figure 12:
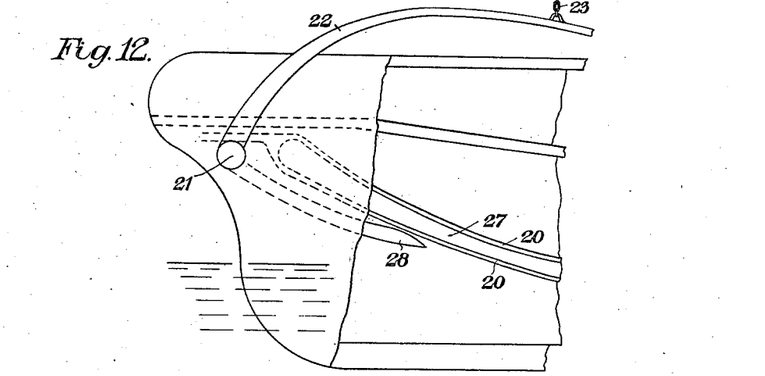
Fig. 12 illustrates part of the said mechanism drawn to a larger scale.

To prevent the escape of air round the edges of the bow plates 20 rubber flanges or the like 27 may be fitted to the edges of these plates as shown in Fig. 12. In this case the plates 20 may be raised when desired by means of arms 28 secured to the pivots 21 and bearing directly against the under side of the plates 20, the pivots 21 being operated as before by the devices 22, 23, 24, 25, 26. Fig. 7 shows another device which may be employed for the purpose of preventing the escape of air round the edges of the bow plates 20. In this arrangement a sheet 29 of a suitably flexible material is connected airtight at the upper part to the bow plate 20 and at the lower part to the air chute plates 9 the arrangement being such as to provide a kind of bellows chamber as will be seen in this figure. This arrangement can also be operated when desired by the devices already described and illustrated in Figs. 1, 2 and 12.

Figure 13:
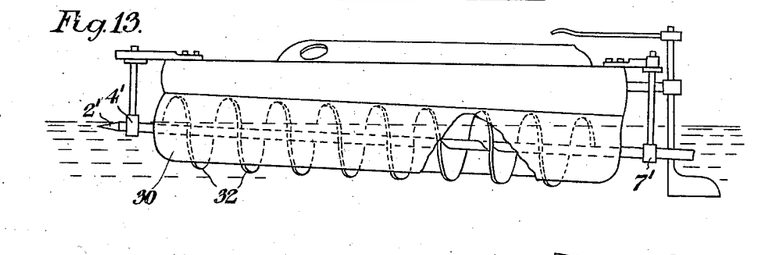
Fig. 13 illustrates a modified arrangement of the aero-hydro screw propeller and vessel shown in Figs. 1, 2, and 8 the vessel being under propulsion.
Figure 14:
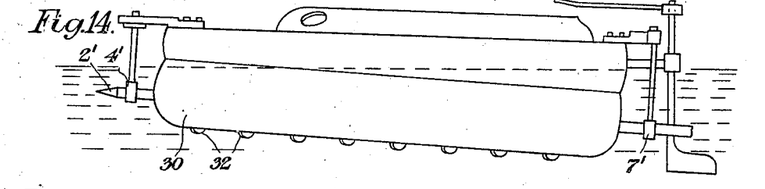
Fig. 14 illustrates the vessel shown in Fig. 13 when in repose and therefore deeper in the water.
Figure 15:
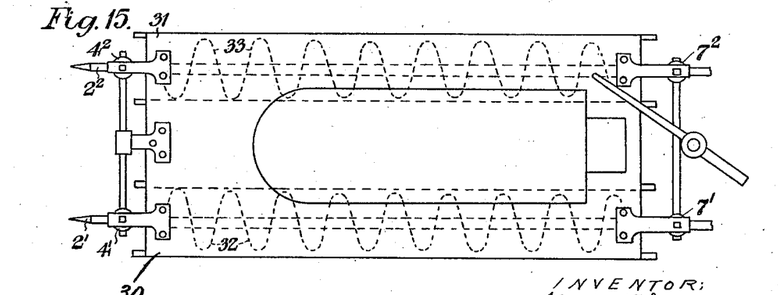
Fig. 15 is a plan view of the vessel shown in Figs. 13 and 14.

Figs. 13 to 20 show various modified arrangements of the aero-hydro screw propeller which has already been described hereinbefore. Figs. 13, 14, and 15 illustrate an arrangement for the application of this propelling device to a different type of vessel to that shown in Figs. 1 and 2. In this arrangement two long parallel semi-cylinders 30, 31 are provided each enclosing an aero-hydro screw, such as 32, and 33, having a continuous worm formation extending throughout the length of the semi-cylinders. In this case the driving shafts $2''$ $2^2$ are supported in forward bearings $4'$, $4^2$ and after bearings $7'$, $7^2$ supported from the upper part of the vessel in the manner shown. Upon these semi-cylinders 30, 31 the vessel is built up. Power may be applied to drive these aero-hydro screws either at the bow or stern of the vessel. On the screws being driven the air entrapped by the worm plate at the bow end is passed down to a lower level beneath the water at the stern end thus providing an air buoyancy within each semi-cylinder which buoyancy is, wholly or partly, available for supporting the vessel, while in motion, above the general level of the surface of the water, the semi-cylinders and vessel travelling at a constant inclination as shown.

Fig. 14 shows the vessel at rest and Fig. 13 the same under propulsion and therefore higher out of the water than in Fig. 14.

Figs. 16 to 20 show an arrangement of the aero-hydro screw propeller in which a worm plate 15 is fixed round the interior wall of a complete cylinder 16 as already described with reference to Fig. 9, and a second worm plate 34 is also fixed around the exterior wall of the cylinder 16 thus increasing considerably the engaging surface of the screw in contact with the water.

Figure 17:
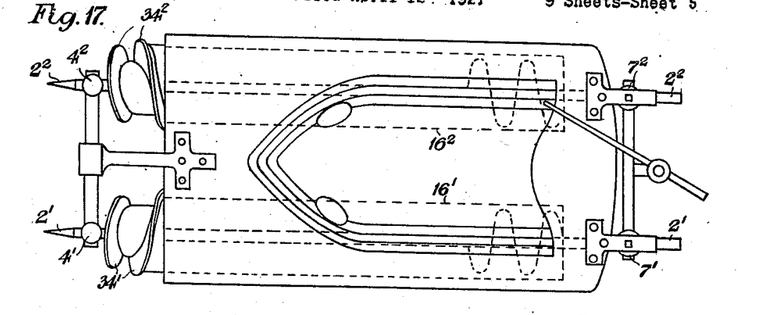
Figure 18:
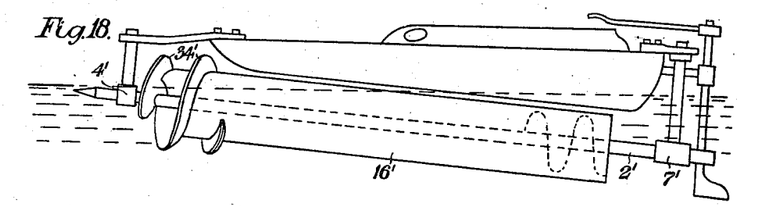
Fig. 18 is a side view of a vessel equipped with two cylindrical aero-hydro screw propellers, one on each side.

Figs. 17 and 18 show the employment of two such complete cylinders fitted with interior and exterior worm plates, the arrangement being somewhat similar to that shown in Figs. 13, 14 and 15. The two cylinders $16'$ and $16^2$ (Fig. 17) are arranged parallel to one another and extend the full length of the vessel, being mounted, as in the said former arrangement, on shafts $2'$, $2^2$ supported in forward bearings $4'$, $4^2$ and in after bearings $7'$, $7^2$. As the cylinders $16'$ and $16^2$ are rotated air and water are forced through their whole length by the worm plates 15 and 34, the cylinders being rendered buoyant by the entrapped air filling the upper parts of the same and thus enabling the cylinders to lift the vessel upon which they act through the supports of the bearings $4'$ $4^2$, $7'$, $7^2$. The said entrapped air is, in this arrangement, allowed to escape at the after end of the cylinders beneath the surface of the water.

Figure 16:
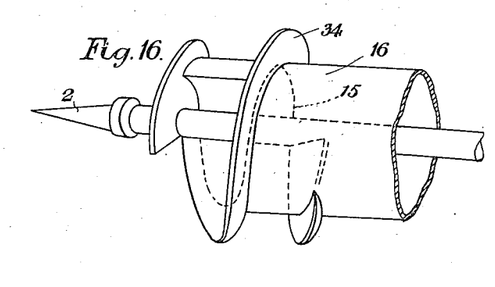
Fig. 16 illustrates a modified form of the aero-hydro screw propeller shown in Figs. 9 and 10.
Figure 19:
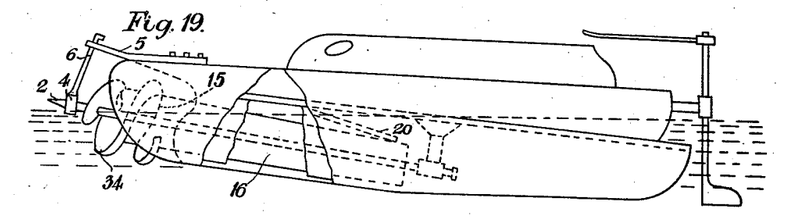
Figure 20:
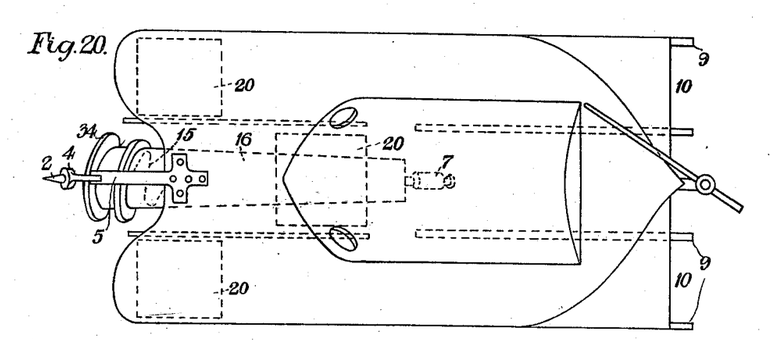
Fig. 20 is a plan view of a vessel equipped with a single cylindrical aero-hydro screw propeller centrally arranged.
Figure 21:
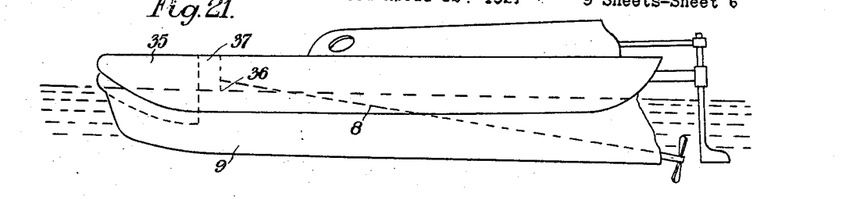
Fig. 21 illustrates a modification of the construction shown in Fig. 1 designed to avoid the necessity for the bow plates shown therein.
Figure 22:
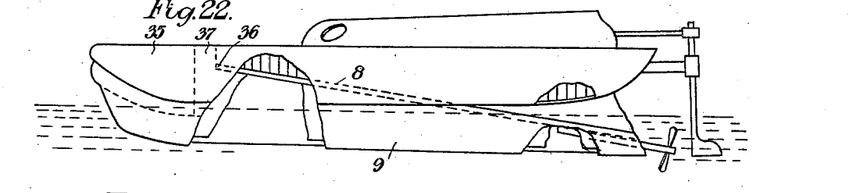
Fig. 22 illustrates the vessel shown in Fig. 21 when under propulsion, that is, higher out of the water.

Figs. 19 and 20 show an arrangement in which a single aero-hydro screw such as that shown in Fig. 16 is employed, the said screw both propelling the vessel and forcing air through the rotating cylinder 16. In this arrangement the after end of the cylinder 16 terminates at about the centre of the bottom of the vessel where the air forced by the screw is compressed and accumulated, the escape of the air forward being prevented by the three trailing bow plates 20 as shown in dotted lines in Fig. 20.

Figure 25:
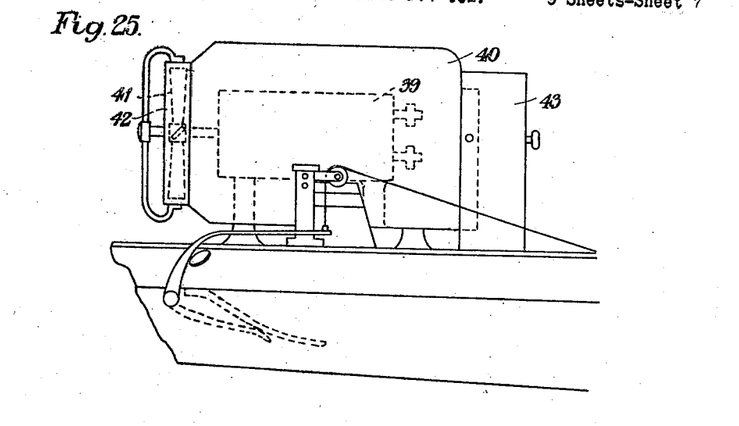
Fig. 25 illustrates an arrangement of an aerial propeller driven by an internal combustion engine mounted upon the deck of the vessel and adapted both to propel the vessel and also to force air beneath the bottom of the same.
Figure 26:
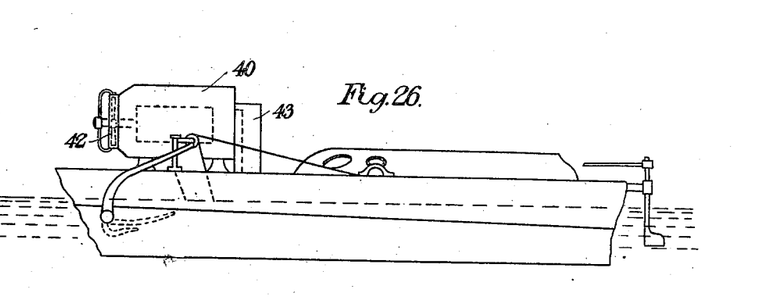
Figs. 26 and 27 illustrate modifications of the arrangement shown in Fig. 25.
Figure 27:
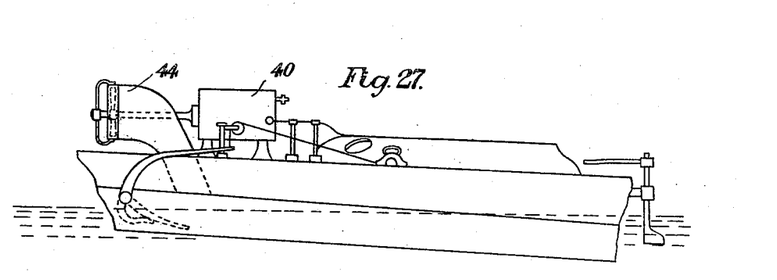

Figs. 21, 22, 23 and 24 illustrate a modification of my improved construction designed to avoid any necessity for the bow plates 20 employed in the construction hereinbefore described. In this modification the vessel is constructed with a rigid bow portion 35 arranged in front of and extending back to the point 36 (Figs. 21 and 22) where the inclined true bottom 8 of the vessel commences and reaches its highest level, the said bottom 8 declining from the point 36 to the stern. Air chute plates 9 are provided as before and an air passage 37 is arranged to lead from the deck to the vessel's bottom. In this construction the air chute plates have their greatest depth at their forward ends thus forming deep chutes or troughs immediately behind the bow portion 35 which chutes diminish in depth towards the stern, and any suitable arrangement of air forcing apparatus may be mounted upon the deck of the vessel to force the air down the passage 37 to the vessel's bottom, such for example as shown in Figs. 25 to 27 hereinafter described. Fig. 24 shows a wide air inlet opening 38 arranged upon the deck of the vessel and adapted to entrap air and conduct it through the passage 37 to the bottom of the vessel under the effect of the ship's motion and without any such air forcing apparatus being required.

In all the forms shown in Figs. 21, 22, 23 and 24 the vessel is propelled by means of an ordinary screw propeller driven by any suitable engine or motor. The motion of the vessel, in the arrangement according to Fig. 24, results in air being accumulated under pressure in the air chutes beneath the vessel's bottom thus tending to raise the vessel and depress the surrounding water level and giving the same advantages as with the previously described constructions.

Figs. 25, 26 and 27 show an arrangement of the kind mentioned hereinabove, in which an aero engine and propeller are mounted upon the deck, the engine 39 being enclosed in a cylindrical casing 40 and the propeller 41 in a smaller cylinder 42. Access to the engine is afforded by means of a door 43. The propeller 41 both propels the vessel and also forces air beneath it by way of the engine casing 40 and thence by a suitable passageway, with the same results and advantages as in the other modifications hereinabove described. The vessel is shown at rest in Fig. 26 and in motion in Fig. 27 and therefore higher in the water than in Fig. 26. In Fig. 27 the propeller is enclosed in a casing 44 entirely separate from the casing 40 of the engine 39, and the said propeller casing 44 is directly connected to the air passage leading to the bottom of the vessel. In all these arrangements the air chutes and bow plates as hereinabove described may, and ordinarily would, be employed.

Figs. 28 to 32 illustrate apparatus for forcing and compressing air which apparatus was specially designed for use with the improved construction according to the present invention. These figures are diagrammatic, like the remaining figures already described, but are sufficient to enable those skilled in the art in question to understand the nature and operation of the apparatus referred to which is designed to enable a supply of air under pressure to be obtained by the motion of the vessel through the air, or by means of the wind, that is, without requiring any auxiliary power apparatus for this purpose.

Figure 28:
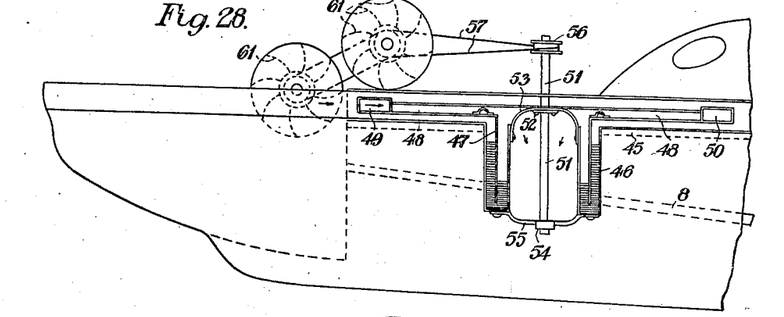
Fig. 28 is a vertical sectional view of air forcing and compressing apparatus designed by me and suitable for employment with the present invention.

Referring to Fig. 28 the air forcing apparatus shown herein is secured between the underside of the deck 45 and the bottom 8 of the vessel near the bow and consists of two distinct sections, one 46 fixed and the other 47 rotatable. The fixed section 46 consists of a double-wall cylindrical member the two walls of which are connected together at the bottom to form a U-shaped cross section or an annular chamber, adapted to hold water, the ends of the inner cylinder being open. The rotating section 47 consists of a simple cylinder having such a diameter that it can rotate easily without contact within the annular chamber of the fixed section 46 and is surmounted by a large hollow circular chamber 48 on the closed periphery of which, at the opposite ends of a diameter, two projecting openings 49, 50 are provided to form air scoops adapted to scoop in and entrap air when the vertical shaft 51 supporting the elements 47, 48 is rapidly rotated. This shaft 51 is supported in a vertical position in an upper bearing 52 in a bracket 53 secured to the upper part of the inner wall of element 46 and in a lower bearing 54 in a bracket 55 secured to the lower part of the element 46. On the upper end of shaft 51 is secured a pulley 56 which is engaged by a belt or the like 57 by means of which the said shaft and the rotating elements 47, 48 supported thereon can be driven, for example, by an air turbine of the kind hereinafter described which is adapted to be operated by the advancing motion of the vessel through the air, a horizontally arranged form of the turbine being shown in Figure 28 in dotted lines merely by way of example.

When the rotary elements 47, 48 are rapidly rotated by means of the driving elements 51, 56, 57, the projecting openings or air scoops 49, 50 are forced through the air and the entrapped air is passed through the open central part of the apparatus below the bottom 8 of the vessel as shown by the arrows, the air being compressed within the air chutes to a degree corresponding to the angular velocity of the periphery, and thus of the scoops 49, 50, of the hollow chamber 48, the air being prevented from passing round the lower edge of the rotating cylinder 47 by the water in the annular chamber of the fixed element 46.

Figure 29:
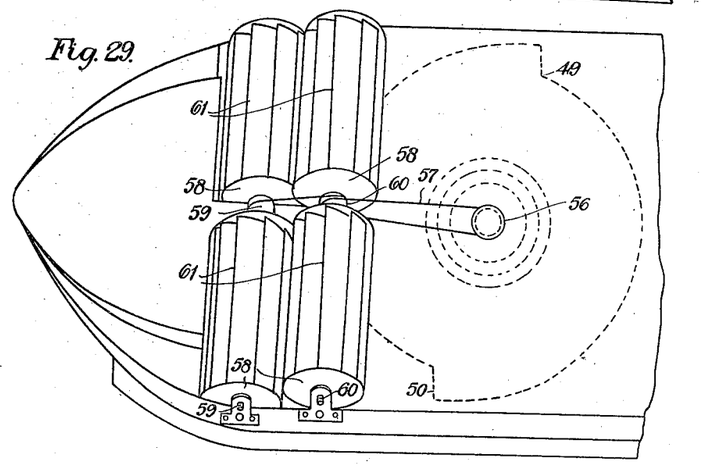
Fig. 29 is an elevational view of the air forcing means shown in Fig. 28.

Fig. 29 shows a suitable form of the air driven turbine consisting of four horizontally arranged rotors 58 mounted in pairs on shafts 59 and 60 arranged upon the deck transversely to the longitudinal axis of the vessel and at the bow end of the latter. These rotors are provided with vanes 61 formed and arranged so that the vanes 61 on the upper side of the rotors 58 are engaged by the air, as the vessel advances and the rotors 58 and shafts 59 and 60 are thereby all rotated in the same direction, the rotary movement being transmitted by any suitable gearing to the rotary element 47 of the air forcing apparatus, for example by means of the belt 57 and pulley 56.

Figure 30:
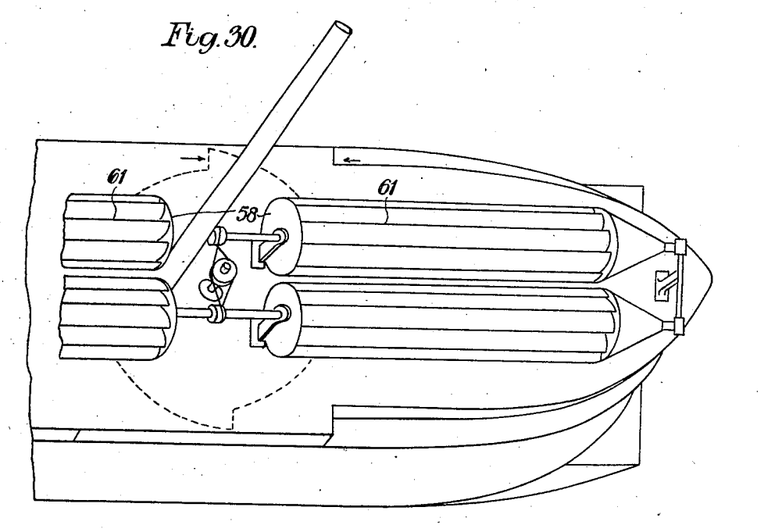
Fig. 30 shows a modification of the air forcing means according to Figs. 28 and 29 adapted to be operated by a side wind blowing from either quarter.

Fig. 30 shows air turbine rotors 58 arranged longitudinally in two pairs, one pair adapted to be rotated in one direction and the other pair in the opposite direction, each pair being geared to the air forcing apparatus.

This arrangement enables the air forcing apparatus to be rotated by a side wind from whichever quarter the wind may blow and is adapted to be used by a vessel propelled by means of sails, the vessel thus being provided with, and lifted by, compressed air.

Figure 31:
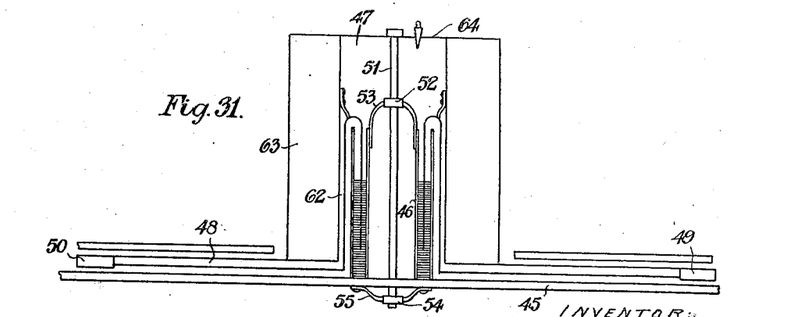
Figs. 31 and 32 show a modified form of the air forcing and compressing apparatus according to Fig. 28 in which the rotating hollow chamber with ears, or air scoops, is arranged at the bottom of the apparatus instead of at the top as shown in the said Fig. 28, and in which the outer cylinder of the apparatus is provided with vanes to form the rotary element of an air turbine adapted to be driven by the forward motion of the vessel through the air, the apparatus being mounted upon the deck of the vessel.
Figure 32:
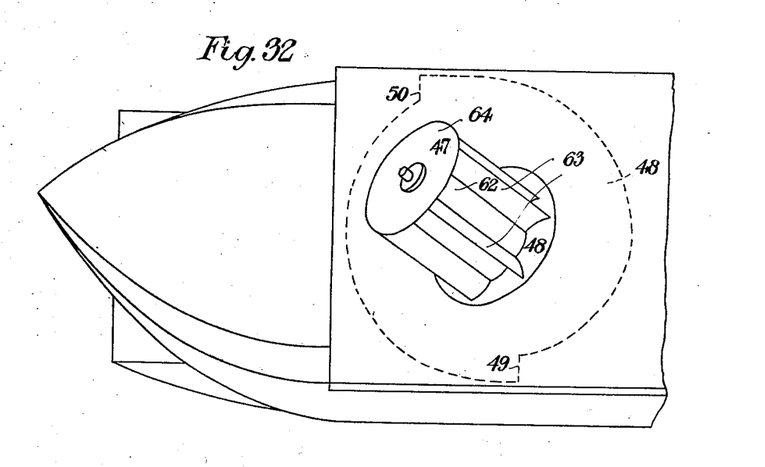

Figs. 31 and 32 show a modification of the construction shown in Fig. 28, in which the apparatus is arranged and secured upon, instead of beneath, the deck 45 and the hollow chamber 48 is arranged at the bottom instead of at the upper end of the rotating element 47. This modification also includes the addition of an external cylinder 62 to the rotating element 47, this cylinder 62 being provided with vanes 63 arranged upon the external surface of the same in such a manner that during the vessel's forward motion the vanes 63 upon one side of the cylinder 62 engage the air while the vanes at the opposite side of said cylinder escape from the air, thus creating a difference of pressure and a turning couple at the opposite ends of each diameter of the cylinder 62 and causing the rotary element 47 to be rotated. The vanes 63 may conveniently be secured between an upper end plate 64 secured to the shaft 51, and the upper surface of the hollow chamber 48 as clearly shown in these figures, Fig. 32 showing the general arrangement in perspective. By means of this modification the rotary air-forcing element 47 is made in one with a simple form of vertical air turbine adapted to automatically operate the apparatus whenever the vessel is propelled in the forward direction.

Ships and the like vessels embodying my improved construction lie when at rest at a lower level in the water than when in motion; but the bow portion always has an upward inclination and the stern portion is relatively depressed.

When the ship is brought to rest the air may be allowed to escape from beneath the bottom by blowing forward under the pneumatic bow plates and beneath the surface of the water, but this blowing is at once automatically stopped when the ship is given forward motion.

Relatively to ships of the ordinary construction my improved ships and vessels are designed to be shorter and of shallower draught but of considerably greater breadth of beam. My ships are flat bottomed but are designed to be more lightly laden and with less draught at the bow than at the stern, the latter part being laden as heavily as may be practicable in each case. In fact these ships are intended to be heavy cargo-carriers and even to meet naval requirements.

What I claim and desire to secure by Letters Patent is:—

1. In ships, boats, and similar vessels, the combination with a bow portion having a shallow draught and a stern portion having a relatively deeper draught, of air storage chambers arranged beneath the bottom of the vessel and rotary apparatus carried by the vessel adapted to be actuated by the motion of the vessel through the water for compressing air from the surrounding atmosphere into the storage chambers.

2. In a vessel designed to travel upon water the combination with a bow portion having shallow draught and a stern portion of relatively deeper draught, of an air storage chamber arranged beneath the bottom of the vessel and having open ends, a passage leading direct from the surrounding atmosphere into the open bow end of the said storage chamber, and means actuated by the motion of the vessel through the water for forcing air into the said passage.

3. In a vessel designed to travel upon water the combination with a bow portion having a shallow draught and a stern portion of relatively deeper draught, of an air storage chamber arranged beneath the bottom of the vessel and having open ends, a passage leading direct from the surrounding atmosphere into the open bow end of the said storage chamber, and a rotary air propeller adapted to be actuated by the motion of the vessel through the water and to force air into the said passage and to simultaneously propel the vessel, and power apparatus for driving the propeller.

In testimony whereof I have signed my name to this specification.

HENRY CLAY.